United States Patent [19]

Kunin

[11] 4,083,782

[45] Apr. 11, 1978

[54] WATER CONDITIONING PROCESS

[75] Inventor: Robert Kunin, Yardley, Pa.

[73] Assignee: Rohm and Haas Company, Philadelphia, Pa.

[21] Appl. No.: 520,322

[22] Filed: Nov. 4, 1974

Related U.S. Application Data

[63] Continuation-in-part of Ser. No. 340,503, Mar. 12, 1973, abandoned.

[51] Int. Cl.$^2$ ............................................. C02B 1/76
[52] U.S. Cl. ................................. 210/32; 210/38 A; 210/38 B
[58] Field of Search ....................... 210/24, 30, 32, 57, 210/38

[56] References Cited

U.S. PATENT DOCUMENTS

| | | |
|---|---|---|
| 2,374,100 | 4/1945 | Jackson .................................. 210/57 |
| 3,342,730 | 9/1967 | Mihara et al. ..................... 210/38 A |
| 3,414,507 | 12/1968 | Calmon .................................. 210/32 |
| 3,493,498 | 2/1970 | Abrams et al. ........................ 210/32 |
| 3,663,163 | 5/1972 | De Prec et al. ....................... 210/38 |
| 3,767,600 | 10/1973 | Albright ................................. 210/38 |

*Primary Examiner*—Charles N. Hart
*Assistant Examiner*—Benoit Castel
*Attorney, Agent, or Firm*—Louis F. Kline, Jr.

[57] ABSTRACT

Water is conditioned by contacting it with a weak acid cation exchange resin based upon a crosslinked methacrylic acid copolymer structure in the alkali metal (or ammonium) form. The resin when exhausted may be regenerated by either a two-step acid/alkali technique or by a one-step technique using a citric or fumaric acid solution or a poly or hexamethaphosphate solution. Water by this method is substantially free of hardness ion, dissolved heavy metal ions and has a corrected pH between 7 and 9.5, preferably between 8 and 8.5.

7 Claims, No Drawings

WATER CONDITIONING PROCESS

This application is a continuation in part of my co-pending application, Ser. No. 340,503, filed on Mar. 12, 1973, and now abandoned.

BACKGROUND OF THE INVENTION

Water conditioning for the home and in industry has become increasingly important in recent years due to the great number of housing units built in poor quality water areas. Water formed in such areas is frequently acidic and may contain dissolved heavy metals in addition to hardness ions. The pH of acid water in these areas often is about 6 and it is not uncommon to have water register 5 on the pH scale. Accentuating the problem is the fact that many of today's appliances used in the home or in industry require good quality water. Plumbing materials such as copper piping or tubing are particularly sensitive to the corrosive nature of inferior water. For example, pitting of copper piping and the blue-green staining of porcelain sinks and clothes are tell-tale signs of corrosive water problems. Although softening of water by ion exchange has removed many of the hardness problems associated with poor quality water, this well known technique will not correct acid water conditions or remove dissolved heavy metals such as iron or copper. Since the corrosivity of water is a function of acidity, carbon dioxide and hardness, eliminating hardness may not solve a corrosion problem. Indeed the softening of water may actually increase the corrosion index of water, unless the softening is accompanied by an increase in pH value. It is therefore clear that mere softening of water in problem areas is no longer sufficient.

Although it is possible to cure water problems caused by hardness, acidity, and the presence of dissolved heavy metals by a variety of techniques utilizing caustic feeders, calcite neutralizers followed by softeners, chlorine feeders plus retention tanks, carbon filters and $KMnO_4$-treated gel zeolites, such techniques can be practical only when practiced on an industrial scale because the multitude of tanks, the presence of toxic or otherwise dangerous chemicals, and the costly metering and instrumentation devices necessary for acid control precludes the use of such combined techniques in the home.

Today approximately 16 million people in the United States alone live in acid water areas and it is therefore clear that a simple technique for conditioning poor quality water is urgently required.

It has now been discovered that certain weak acid cation exchange resins will not only soften water but will additionally correct, if necessary, the acidity of such water and remove any dissolved heavy metals that may be present in the water. According to the preferred embodiments of the present invention acid waters may be made alkaline, hard waters softened, and dissolved heavy metals substantially removed from any water supply by the simple treatment with one carboxylic ion exchange resin without requiring complicated tank systems or expensive instrumentation.

The carboxylic resins which may be used in the process of the invention are those in which the carboxylic acid group is provided by copolymerizing methacrylic acid and a suitable crosslinking monomer such as divinyl benzene. Alternative crosslinking monomers include trimethylolpropane trimethacrylate, divinyltoluenes, divinylnaphthalenes, diallyl phthalate, ethylene glycol diacrylate, ethylene glycol dimethacrylate, divinylxylene, divinylethylbenzene, divinylsulfone, divinyl pyridine, divinylketone, divinylsulfide, allyl acrylate, diallylmaleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'methylene dimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and the monothio or dithio derivatives of glycols.

Particularly preferred crosslinking monomers include the following: Polyvinyl aromatic hydrocarbons, such as divinylbenzene and trivinylbenzene, glycol dimethacrylates, such as ethylene glycol dimethacrylate, and polyvinyl ethers of polyhydric alcohols, such as divinoxyethane and trivinoxypropane. Although the crosslinking monomer may be present in an amount of 0.5 to 10% by weight, too small an amount may be inadequate for physical stability or insufficient to adequately correct the pH in certain acid waters. If too much crosslinker is present, the resin will perform unsatisfactorily because of poor reaction rates. Accordingly, it has been found that an amount of 2.5 to 10% of crosslinker gives satisfactory results. Methacrylic acid resins of the type useful in the practice of the present invention are known and are commercially available and the preparation of resins of this type is set forth in detail in U.S. Pat. Nos. 2,340,110; 2,340,111; 2,541,420 and 3,156,644. The information therein is incorporated herein by reference. One particularly preferred carboxylic resin is prepared by suspension polymerizing a mixture of methacrylic acid and divinylbenzene using from about 3-10% DVB. This type of resin in the hydrogen form is commercially available from Rohm and Haas Company as Amberlite IRC-50. The resins suitable for use in the process of the invention may be gel or macroreticular in structure. For the purposes of this invention by "macroreticular" is meant a structure as described in UK Patent No. 932,125 which patent also describes methods involving various solvents or phase extenders suitable in the preparation of macroreticular resins. Alternatively one may use a phase extender system such as toluene and methylisobutyl carbinol.

As noted the resins are intended to be used in their alkali metal salt or ammonium salt form. By "alkali metal" is meant sodium, potassium, or lithium. Although any of the above forms may be acceptable in industrial use, the Na+ form is much preferred for home use, since the alternative forms could in extreme instances cause the treated water to be physiologically unacceptable.

The actual method of contact of the resin with the water is not considered critical to the practice of the invention. A suitably sized resin bed may be established by any known method to suit the extent and nature of the operation involved. The water to be treated is normally passed through the resin bed at a rate of from 1 to 8 gallons per minute per cubic foot (gpm/ft.$^3$).

Upon exhaustion of the resin it may be regenerated by one of several methods. Regardless of which method is used, the resin should be regenerated to a range of 70-96% of its salt form. If the resin is regenerated beyond 96% the treated water will probably be too alkaline for normal use and have a pH higher than the desirable range of 7-9.5.

A commonly known method of regenerating a weak acid cation exchange resin is the acid/alkali technique. This two-step method has been heretofore the only practical method available to regenerate weak acid cation exchange resin. In the first step of this two-step method the hardness ions such as Ca++ and Mg++ are removed from the resin by the use of excess acid. Several acids such as hydrochloric or sulfuric are acceptable; however hydrochloric acid is preferred since it serves to remove any accumulated oxides of iron, aluminum, manganese and copper and hence maintain the resin in a relatively clean condition. If so desired a back wash operation may precede the acid wash. Although the amount of acid may range from 2 to 10 lbs. per cubic foot of resin when HCl is used and applied in a 1 to 10% aqueous solution, it is desirable to regenerate with about 3.5 lbs. of HCl/ft.$^3$ of resin using a 5% solution. If the acid used is $H_2SO_4$, lower concentrations generally from 0.1 to 5% solution are recommended. The second step of this method comprises the addition of the alkali. For the preferred sodium form of the resin, there may be added sodium hydroxide, sodium carbonate or sodium bicarbonate in an amount sufficient to neutralize from 70-96% of the theoretical exchange capacity of the resin in the salt form. If a different alkali metal salt or ammonium form is required, the corresponding hydroxide, carbonate or bicarbonate should be used. A typical acid/alkali regeneration procedure is set forth here below.

| Step | Approximate time in minutes |
| --- | --- |
| Optional back wash (until clear) | 15 |
| Acid regeneration (0.5 gpm/cu. ft.) | 25 |
| Rinse (0.5 gpm/cu. ft.) | 10 |
| Caustic Addition (0.5 gmp/cu. ft.) | 10 |
| Slow rinse (0,5 gpm/cu. ft.) | 10 |
| Hold | 15 |
| Final rinse | 30 |
| Final back wash | 5 |

It has also been discovered that a solution of alkali metal salts of citric or fumaric acid is capable of satisfactorily regenerating the resins used in the process of the invention. This regeneration technique is but a one-step method and due to the absence of strong acids is admirably suited to today's environmental requirements. Furthermore, the one-step technique is clearly far more convenient than the acid/alkali method for regenerating permanent water conditioning units in some locations such as in the home.

A preferred regeneration method would use an aqueous solution of a mixture of 97.5-90% sodium citrate and 2.5-10% sodium hydroxide in an amount to yield 70-96% regeneration. The amount of chemical regenerant normally required to achieve such a regeneration is usually at least 3 lbs. per cubic foot of resin to be regenerated. Although skilled workers in the art may use varying concentrations of aqueous solution, it is recommended that the solution have a minimum concentration of two percent. For the purpose of this invention it should be understood that by "regenerated to 70-96% of the salt form" is meant a regeneration to either a substantially pure salt form as in the case of a resin in Na+ form which has been regenerated by the acid/alkali technique or a heterogeneous salt form as in the case of a citric acid or fumaric acid solution regeneration where amounts of other ions such as Mg++ or Ca++ may not have been removed and hence still be present.

Alternatively the sodium citrate solution in the above method may be replaced by sodium fumarate solution without any adverse results.

It has further been found that sodium polyphosphate or sodium hexametaphosphate may also provide a satisfactory regenerant. As with any of the other regenerants used and for reasons which have been explained hereinabove it is necessary to regenerate the resin to yield 70-96% regeneration. Either of the two phosphate regenerant solutions should contain about 4 lbs. of phosphate per cubic foot of resin in a solution of at least 2% concentration. The following experiments illustrating the process of the invention are not to be considered as limitations thereof, since many modifications may be made without departing from the spirit and scope of this invention. Some of the experiments are included for the purpose of comparison only and do not illustrate embodiments of the process of the invention. In the examples and throughout the specification and claims, all parts and percentages are by weight unless otherwise stated.

EXPERIMENT I

A stream of water containing 350 ppm $CaCl_2$ and 150 ppm $MgSO_4$ is adjusted with $H_2SO_4$ to show a pH of 5.0 and passed through different resin beds each having a volume of 250 ml and a bed depth of 30 inches. In each instance the water to be treated is passed through the bed at a rate of 2 gallons per minute per cubic foot of resin. Of the 8 resins tested, Comparative Resin A is a sulfonated styrene-divinyl benzene strong acid cation exchange resin used universally for home water softening, and commercially available from Rohm and Haas Company as Amberlite IR-120(Na).

Comparative Resin B is similar to Resin A except that it is regenerated by the acid-alkali technique using large excesses of acid, rather than Resin A which is regenerated by 20 lbs/ft.$^3$ of NaCl.

Comparative Resin C is a weak acid cation exchange resin based on methacrylic acid copolymerized with 4.5% of divinylbenzene regenerated to 100% of its salt form.

Resin D is similar to Comparative Resin C differing only in that it has been regenerated to 96% of its salt form.

Resin E is similar to Comparative Resin C differing only in that it has been regenerated to 70% of its salt form.

Comparative Resin F is similar to Comparative Resin C differing only in that it has been regenerated to 50% of its salt form.

Comparative Resin G is an acrylic acid copolymer crosslinked with 6% of divinylbenzene regenerated to 100% of its salt form.

Resin H is a methacrylic acid copolymer crosslinked with 2.5% of divinylbenzene and regenerated to 90% of its salt form.

Resin I is similar to Resin E but whereas Resins B, C, D, E, F, G and H are regenerated by the two step acid/alkali technique Resin I is regenerated by a 4% solution containing sodium salt of citric acid and sodium hydroxide in amounts of 4 lbs. and 0.1 lb. respectively per cubic foot of resin.

Resin J is similar to Resin I differing only in that a fumaric acid sodium salt solution rather than a sodium salt solution of citric acid is used as regenerant.

Resin K is similar to Resin E except that the resin is regenerated with 8 lbs/ft.$^3$ of sodium polyphosphate in a solution of 2% concentration.

Resin L is similar to Resin K except that the regenerant was a sodium hexametaphosphate solution used in identical amounts and concentration as mentioned under Resin K.

Comparative M is a methacrylic acid copolymer crosslinked with 1% divinylbenzene and regenerated to 70% of its salt form.

Resin N is similar to Comparative Resin M but is crosslinked with 10% divinylbenzene.

Comparative Resin O is similar to Comparative Resin M with the exception that it is crosslinked with 15% divinylbenzene.

Comparative Resin P is a phosphonated styrene divinylbenzene cation exchange resin regenerated to 70% of its salt form.

Comparative Resin R is similar to Comparative Resin M but rather than 1% divinylbenzene crosslinker it is copolymerized with 8% trimethylolpropane trimethacrylate. This resin again is regenerated to 70% of its salt form.

The results of the tests are set forth in Table I.

Table I

| Resin Type | Average pH of treated water | Softening Capacity |
|---|---|---|
| Comparative Resin A | 5.2 | 35 kilograins/ft.$^3$ |
| Comparative Resin B | 5.2 | 35 kilgrains/ft.$^3$ |
| Comparative Resin C | 10.0 | 40 kilograins/ft.$^3$ |
| Resin D | 9.0 | 39 kilograins/ft.$^3$ |
| Resin E | 7.2 | 30 kilograins/ft.$^3$ |
| Comparative Resin F | 6.5 | 25 kilograins/ft.$^3$ |
| Comparative Resin G | 6.9 | 40 kilograins/ft.$^3$ |
| Resin H | 8.5 | kilograins/ft.$^3$ |
| Resin I | 8.5 | 15 kilograins/ft.$^3$ |
| Resin J | 8.5 | 15 kilograins/ft.$^3$ |
| Resin K | 8.0 | 15 kilograins/ft.$^3$ |
| Resin L | 8.0 | 15 kilograins/ft.$^3$ |
| Comparative Resin M | 6.5 | 25 kilograins/ft.$^3$ |
| Resin N | 8.3 | 29 kilograins/ft.$^3$ |
| Comparative Resin O | 10.2 | 29 kilograins/ft.$^3$ |
| Comparative Resin P | 5.5 | 35 kilograins/ft.$^3$ |
| Comparative Resin R | 7.9 | 26 kilograins/ft.$^3$ |

From the above Table it is clear that only those resins which are regenerated to 70–95% of their salt form give the desired pH level.

EXPERIMENT 2

In order to illustrate the suitability of the process of the invention to remove dissolved heavy metals, the acid water of Experiment 1 was adjusted to additionally contain 3 ppm of iron and 1 ppm of copper passed through some of the resin beds of Experiment 1. Iron and copper were chosen as representatives of such heavy metals as iron, copper, manganese, lead and zinc. The experiment was continued till the resin became exhausted. After regeneration the experiment continued for another run till the resin again became exhausted. After 10 repeated cycles of runs and regeneration, the water was tested for pH, softening capacity, and heavy metal removal efficiency.

The test results are set forth in Table II.

Table II

| Resin | Average pH of treated water | Iron content (ppm) | Copper content (ppm) | Softening capacity kilograins/ft$^3$ |
|---|---|---|---|---|
| *Resin A | 5.2 | 1 | 0.5 | 30 |
| *Resin B | 5.2 | 0.5 | 0.5 | 31 |
| Resin E$_{(1)}$** | 8.5 | <0.1 | 0.1 | 35 |

* Comparative
** Resin E$_{(1)}$ is similar to Resin E except that it is regenerated to 90% of its salt form.

From an examination of Table II it is clear that Resin A or B, although universally accepted as excellent water softeners not only fails to correct acidity but also performs somewhat poorly. Its relatively low softening capacity in the above experiment is caused by the gradual fouling with an accumulation of precipitated oxides of iron and copper.

We claim:

1. A water conditioning process for treating acid water in order to remove therefrom hardness ions, dissolved heavy metals, and to correct the pH of the water to within a range of 7–9.5, which process comprises contacting the water with a weak acid cation exchange resin which has been regenerated to 70–96% of its salt form, the resin comprising a crosslinked methacrylic acid copolymer in the alkali metal or ammonium form wherein the crosslinking monomer is present in an amount of 2.5–10% by weight.

2. A process as claimed in claim 1 wherein the crosslinking monomer is divinylbenzene.

3. A process as claimed in claim 1 wherein the pH of the water is corrected to 8–8.5.

4. A process as claimed in claim 1 wherein the composition range of the methacrylic acid/divinylbenzene copolymer is from 97.5%–2.5% to 90%–10% respectively.

5. A process as claimed in claim 1 wherein the resin is a macroreticular crosslinked methacrylic acid divinylbenzene resin extended with toluene and methyl isobutyl carbinol.

6. A process as claimed in claim 1 wherein the exhausted resin is regenerated by contacting the resin with a solution of alkali metal salts of citric or fumaric acid in minimum amount of 3 lbs. per cubic foot of resin required to yield 70–96% regeneration.

7. Process as claimed in claim 1 wherein the resin is regenerated by contacting the resin with a minimum amount of 4 lbs/ft.$^3$ of resin of at least a 2% solution of sodium polyphosphate or sodium hexametaphosphate to yield 70–96% regeneration.

* * * * *